US011024063B2

(12) United States Patent
Chen et al.

(10) Patent No.: US 11,024,063 B2
(45) Date of Patent: Jun. 1, 2021

(54) PRODUCING WAVY LINES AND CURVES IN A GRAPHIC SHAPE

(71) Applicant: Microsoft Technology Licensing, LLC, Redmond, WA (US)

(72) Inventors: Jessica Chen, Redmond, WA (US); Anne M. Tesar, Seattle, WA (US); Joseph Patrick Bush, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/593,526

(22) Filed: Oct. 4, 2019

(65) Prior Publication Data

US 2020/0357154 A1    Nov. 12, 2020

Related U.S. Application Data

(60) Provisional application No. 62/846,577, filed on May 10, 2019.

(51) Int. Cl.
  *G06T 11/20* (2006.01)
  *G06T 11/40* (2006.01)

(52) U.S. Cl.
  CPC .......... *G06T 11/203* (2013.01); *G06T 11/40* (2013.01)

(58) Field of Classification Search
  CPC ............................. G06T 11/203; G06T 11/40
  See application file for complete search history.

(56) References Cited

U.S. PATENT DOCUMENTS

2014/0267302 A1* 9/2014 Lubetkin ............... G06T 11/203
                                                              345/467
2015/0178961 A1    6/2015 Karras

OTHER PUBLICATIONS

Desruisseaux, Bernard, "Random Dynamic Fonts", A Thesis Submitted to the Faculty of Graduate Studies and Research in Partial Fulfillment of the Requirements of the Degree of Master of Science, Oct. 31, 1996, 82 Pages.
Devroye, et al., "Random Fonts for the Simulation of Handwriting", In the Journal of Electronic Publishing, vol. 8, Issue 4, Dec. 31, 1995, pp. 281-294.
"International Search Report and Written Opinion Issued in PCT Application No. PCT/US20/026800", dated Jun. 5, 2020, 13 Pages.
Thomas, et al., "Leveraging the Mixed-Text Segmentation Problem to Design Secure Handwritten CAPTCHAs", In Proceedings of 12th International Conference on Frontiers in Handwriting Recognition, Nov. 16, 2010, pp. 13-18.

* cited by examiner

*Primary Examiner* — William A Beutel

(57) ABSTRACT

Embodiments disclosed herein provide methods and systems for producing wavy shapes, where the lines and/or curves that form the wavy shape are curvy and can appear hand drawn or scribbled. Initially, a shape is separated into one or more individual lines and/or one or more Bezier curves. Each original line is perturbed to produce a wavy line using bounding regions that constrain the amount of waviness produced in the line. Each Bezier curve is transformed into a wavy Bezier curve using bounding regions that constrain the amount of waviness produced in the Bezier curve. Each original line or Bezier curve can be modified to include, for example, one or more curves, one or more loops, a single arc, one or more spikes, and/or regular or irregular waviness.

20 Claims, 13 Drawing Sheets

PRODUCING WAVY LINES AND CURVES IN A GRAPHIC SHAPE

CROSS-REFERENCE TO RELATED APPLICATION(S)

This application claims priority to U.S. Provisional Application No. 62/846,577 entitled "Sketchy Shapes," filed on May 10, 2019, of which the entire disclosure is hereby incorporated by reference in its entirety.

BACKGROUND

Graphics applications, presentation applications, and other diagramming applications allow users to create a variety of documents, including presentations, diagrams, and drawings. Typically, an application provides various shapes, effects, templates, and other features that a user can access and use when creating a document. The shapes may include general shapes, such as rectangles, ellipses, triangles, and the like, as well as shapes specific to a subject. For example, shapes can be associated with flowcharts, maps, floor plans, organizational charts, computer networks, and engineering. An application can also provide tools that enable a user to create his or her own shapes.

It is with respect to these and other general considerations that embodiments have been described. Also, although relatively specific problems have been discussed, it should be understood that the embodiments should not be limited to solving the specific problems identified in the background.

SUMMARY

Embodiments disclosed herein provide methods and systems for determining parameters associated with a shape effect and applying the effect to one or more shapes. The effect produces wavy shapes, where the lines and curves that form the wavy shape are uneven (e.g., having a form that curves in and/or out) and can appear hand drawn or scribbled. Embodiments can produce different effects on lines and Bezier curves including, but not limited to, one or more curves, one or more loops, a single arc, one or more spikes, and/or regular and irregular waviness.

In one aspect, a method for producing a wavy shape includes separating the shape into at least one of an individual original line or an individual original Bezier curve, where the original line is a straight line and the original Bezier curve is a smooth Bezier curve. When the shape includes an individual original line, the individual original line is divided into one or more wavelets and the original line is transformed into a wavy line using a first bounding region associated with a first endpoint of at least one wavelet or a second bounding region associated with a second endpoint of at least one wavelet. The first and the second bounding regions constrain the positioning of a control point associated with the first and the second endpoints to limit an amount of waviness produced in the original line. When the shape includes an original Bezier curve, the original Bezier curve is transformed into a wavy Bezier curve using a third bounding region associated with a third endpoint of the original Bezier curve and a fourth bounding region associated with a fourth endpoint of the original Bezier curve. The third and the fourth bounding regions constrain the positioning of a control point associated with the third and the fourth endpoints to limit an amount of waviness produced in the original Bezier curve.

In another aspect, a system includes a processing device and a memory operably connected to the processing device. The memory stores instructions, that when executed by the processing device, cause the system to receive a shape and separate the shape into at least one of an individual original line or an individual original Bezier curve. The original line is a straight line and the original Bezier curve is a smooth Bezier curve. When the shape includes an individual original line, the individual original line is divided into one or more wavelets and the original line is transformed into a wavy line using a first bounding region associated with a first endpoint of at least one wavelet or a second bounding region associated with a second endpoint of at least one wavelet. The first and the second bounding regions constrain the positioning of a control point associated with the first and the second endpoints to limit an amount of waviness produced in the original line. When the shape includes an original Bezier curve, the original Bezier curve is transformed into a wavy Bezier curve using a third bounding region associated with a third endpoint of the original Bezier curve and a fourth bounding region associated with a fourth endpoint of the original Bezier curve. The third and the fourth bounding regions constrain the positioning of a control point associated with the third and the fourth endpoints to limit an amount of waviness produced in the original Bezier curve.

In yet another aspect, a method includes separating a shape into at least one of an individual original line or an individual original Bezier curve, where the original line is a straight line and the original Bezier curve is a smooth Bezier curve. When the shape includes an original Bezier curve, a first bounding region is positioned around a first endpoint of the Bezier curve and a control point associated with the first endpoint is moved to a first position within the first bounding region. When the shape includes an individual line, a second bounding region is positioned around a second endpoint of a first wavelet of the original line and a control point associated with the second endpoint is moved to a second position within the second bounding region. In one aspect, the first and the second positions are random positions within the first and the second bounding regions, respectively.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Further, spatially relative terms, such as "beneath," "below," "lower," "above," "upper", "over", "around", and the like, may be used herein for ease of description to describe one element or feature's relationship to another element(s) or feature(s) as illustrated in the figures. The spatially relative terms are intended to encompass different orientations of a feature in use or operation in addition to the orientation depicted in the figures. The features may be otherwise oriented (rotated 90 degrees or at other orientations) and the spatially relative descriptors used herein may likewise be interpreted accordingly.

Disclosed herein are techniques for determining parameters associated with a wavy shape effect and applying the wavy effect to one or more shapes. The wavy effect transforms a distinct or sharply defined original shape into a wavy shape, where the lines and/or curves of the original shape are changed to wavy lines and/or wavy curves that have a form that curves in and/or out. For example, an original smooth line is transformed into a wavy line. In some instances, a wavy shape can appear hand drawn or scribbled.

Embodiments provide an application, such as a diagramming application, with one or more additional effects. The additional effect(s) enhance the user experience with the application and allow the user to create higher quality, more interesting, and/or more diverse documents.

These and other embodiments are discussed below with reference to FIGS. 1-14. However, those skilled in the art will readily appreciate that the detailed description given herein with respect to these Figures is for explanatory purposes only and should not be construed as limiting.

Figure 1:
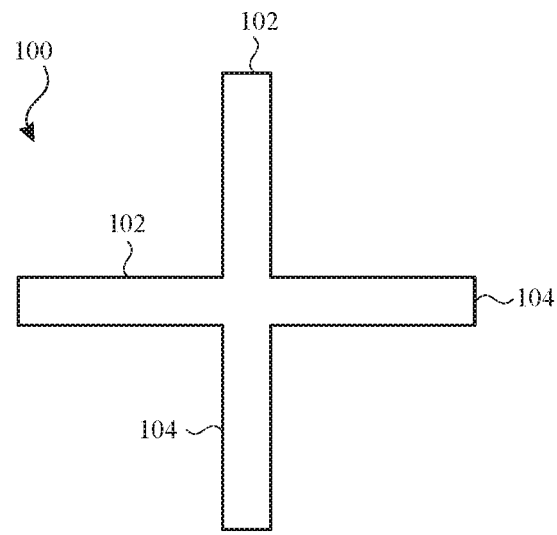
FIG. 1 illustrates an example shape that can be transformed into a wavy shape.

FIG. 1 illustrates an example shape that can be transformed into a wavy shape. The shape 100 is a cross or plus (+) shape. The horizontal lines 102 and the vertical lines 104 that form the shape 100 are straight, even, and smooth.

Figure 2:
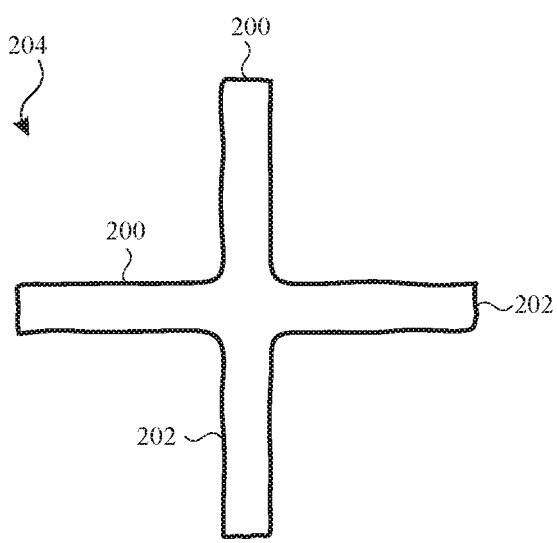
FIG. 2 depicts the example shape shown in FIG. 1 transformed into a wavy shape.

FIG. 2 depicts the example shape shown in FIG. 1 transformed into a wavy shape. The horizontal lines 200 and the vertical lines 202 that form the wavy shape 204 are uneven (e.g., undulating), curvy and appear hand drawn. The term "wavy shape" relates to shapes where the original lines and/or the original curves (e.g., straight line(s) or even and smooth curve(s)) that form the shape have been transformed into wavy or curvy lines and/or wavy or curvy curves. In one non-limiting example, the original lines and the original Bezier curves are modified to create an uneven or wobbly effect reminiscent of hand-drawn lines and curves.

In graphics applications, presentation applications, and other diagramming applications, shapes are typically defined by a series of "moves" between coordinate values. A shape is typically constructed with one or more lines and/or one or more Bezier curves. In many shapes, the line(s) and/or the Bezier curve(s) are linked together and form a path. To draw the shape, a drawing operation is performed between a current point and a specified endpoint as the path is traversed.

Figure 3A:
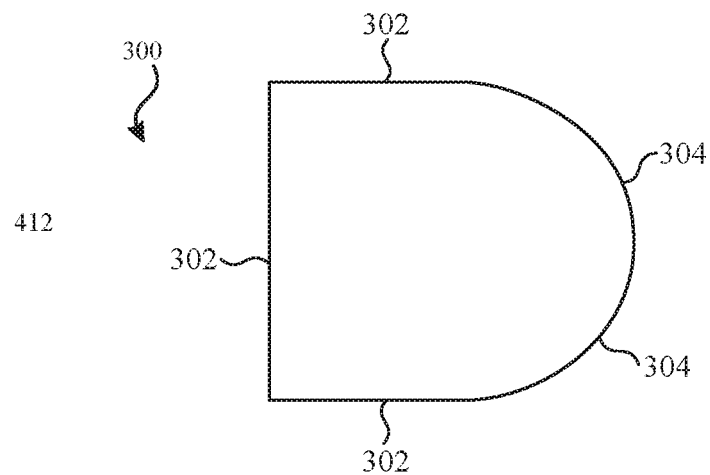
FIG. 3A illustrates another example shape.

FIG. 3A illustrates another example shape. The shape 300 is similar to the capital letter "D" and is constructed with both lines 302 and Bezier curves 304. The lines 302 and the Bezier curves 304 are linked together to form the shape 300. In the distinct shape 300, the lines 302 are straight and smooth line(s) and the Bezier curves 304 are smooth curve(s)).

Figure 3B:
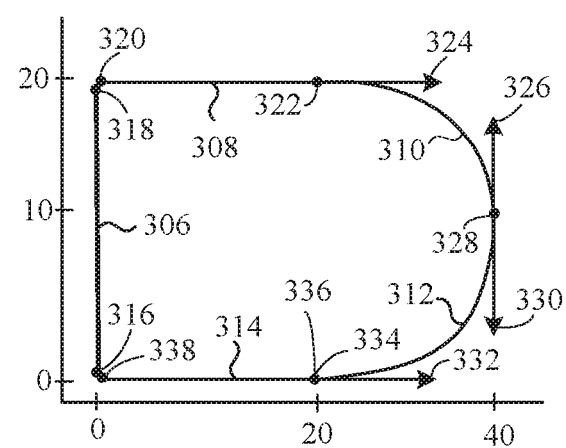
FIG. 3B depicts the line and Bezier curves of the example shape shown in FIG. 3A.

The path of the shape 300 is described in conjunction with FIG. 3B. The path of the shape 300 can be defined as shown in Table 1:

TABLE 1

| OBJECT | PATH OF SHAPE |
| --- | --- |
| Line 306 | first endpoint at (0, 0), second endpoint at (0, 20) |
| Line 308 | first endpoint at (0, 20), second endpoint at (20, 20) |
| Bezier Curve 310 | first control point at (30, 20), second control point at (40, 15), endpoint at (40, 10) |
| Bezier Curve 312 | first control point at (40, 5), second control point at (30, 0), endpoint at (20, 0) |
| Line 314 | first endpoint at (20, 0), second endpoint at (0, 0) |

As shown in FIG. 3B, the path of the shape begins at (0, 0), moves to (0, 20), moves to (20, 20), moves to (40, 10), moves to (20, 0), and ends at (0, 0). The first endpoint 316 of the line 306 is at (0, 0) and the second endpoint 318 is at (0, 20). The first endpoint 320 of the line 308 is at (0, 20) and the second endpoint 322 is at (20, 20). The first control point 324 (represented by an arrow) of the Bezier curve 310 is at (30, 20), the second control point 326 (represented by an arrow) is at (40, 15), and the endpoint 328 is at (40, 10). The first control point 330 (represented by an arrow) of the Bezier curve 312 is at (40, 5), the second control point 332 (represented by an arrow) is at (30, 0), and the endpoint 328 is at (20, 0). The first endpoint 336 of the line 314 is at (20, 0) and the second endpoint 338 is at (0, 0). As will be described in more detail later, the shape 300 is divided or separated into individual lines and/or Bezier curves when the shape 300 is transformed into a wavy shape.

Figure 4:
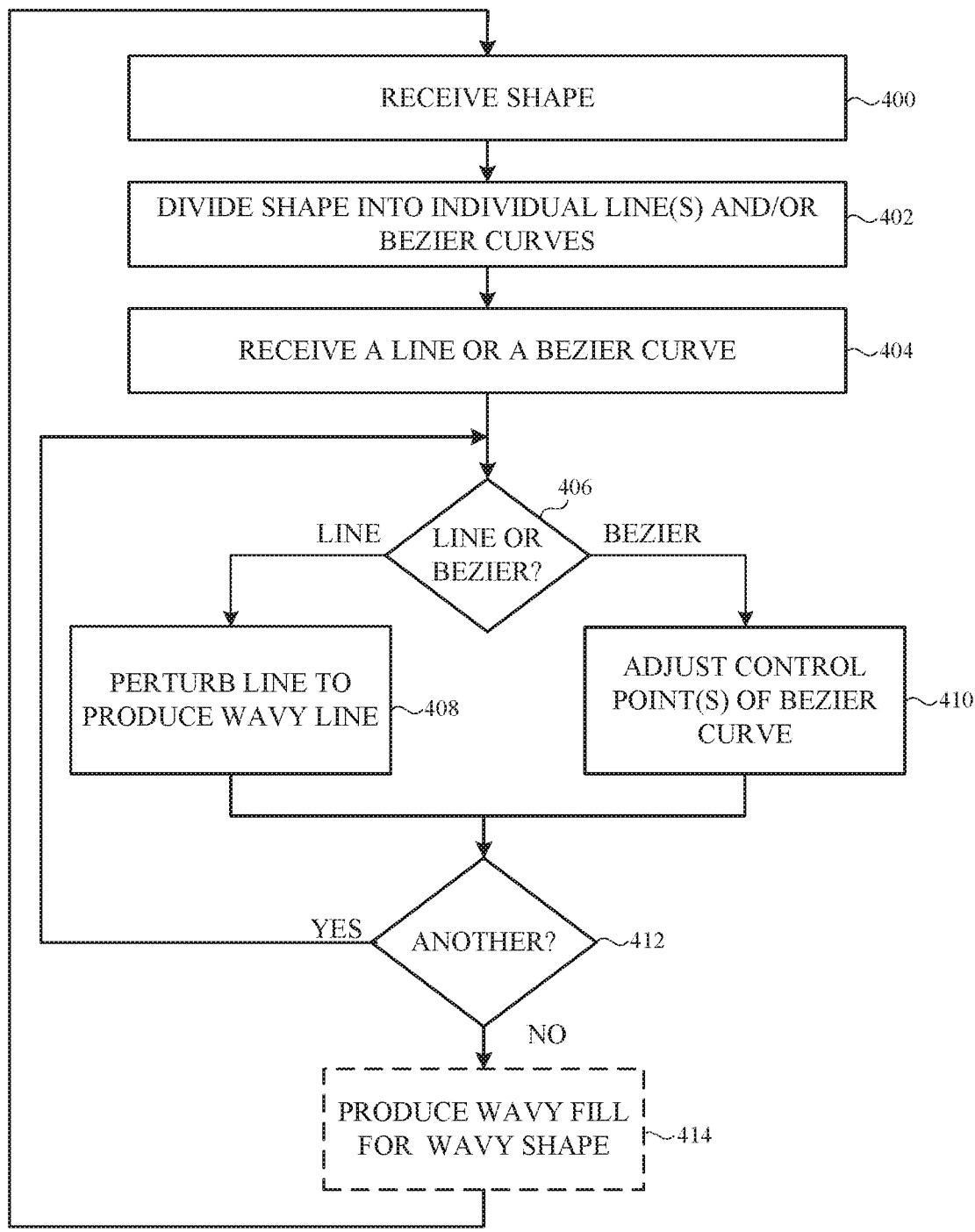
FIG. 4 is a flowchart of an example method of producing a wavy shape.

FIG. 4 is a flowchart of an example method of producing a wavy shape. Initially, as shown at block 400, a shape is received. The shape is separated into individual straight even line(s) (an "original line") and/or individual Bezier curve(s) (an "original Bezier curve") at block 402. In one aspect, the original straight line(s) and/or original Bezier curve(s) are determined based on the path of the shape. Based on the path, the original line(s) and/or original Bezier curve(s) are separated into individual original line(s) and/or original Bezier curve(s).

An original line or an original Bezier curve is then received at block 404 and a determination is made as to whether an original line or an original Bezier curve was received (block 406). In some instances, the determination can be based on how an original line or an original Bezier curve is defined or specified when it is received. In one embodiment, an original line is defined as a line between two endpoint values and an original Bezier curve is defined as a line to a specified endpoint value with two control points.

When it is determined at block 406 that an original line is received, the process continues at block 408 where the original line is perturbed to produce an wavy line. The original line is transformed into an uneven or curvy line (e.g., a wavy line). One technique for producing a wavy line is described in conjunction with FIG. 5.

When a determination at block 406 is that an original Bezier curve is received, the method passes to block 410 where one or both control points of the original Bezier curve are adjusted to produce a wavy Bezier curve. The original Bezier curve is transformed into a distorted curve. After block 408 or block 410, the process continues at block 412 where a determination is made as to whether another original line or another original Bezier curve is to be received. If so, the method returns to block 406 and repeats until all of the individual original lines and/or individual original Bezier curves of the shape have been transformed into wavy lines and/or wavy Bezier curves.

When it is determined at block 412 that another original line or original Bezier curve will not be received, the process passes to optional block 414. Block 414 is performed when the interior area of a wavy shape is filled with a fill (e.g., a color, a gradient, a pattern). When one path defines both the fill and the shape, the path is changed to two separate paths that are processed separately. For example, the path of the shape can be processed at a first time and the path of the fill is processed at a different second time. In one embodiment, the path of the shape and the path of the fill are processed using the techniques shown in FIG. 4.

In some instances, the path of the shape and the path of the fill will not line up exactly with each other due at least in part to the random perturbations of the control points of existing Bezier curves and the differences in the divisions of the lines into one or more line segments (referred to herein as wavelets). The path used by the shape and the path used by the fill can be slightly different. In some situations, processing the path of the fill separately from the path of the shape can generate slightly different results, creating areas where the fill does not quite reach an interior edge of the shape (creating a gap where the background is visible) or where the fill extends beyond the interior edge of the shape.

Other embodiments can add blocks, omit blocks, modify blocks, or rearrange the blocks shown in FIG. 4. For example, in some embodiments, block 414 may be omitted. Additionally, although FIG. 4 is described as processing each original line and/or original Bezier curve iteratively, the method can be modified to process multiple original lines and/or original Bezier curves in parallel.

Figure 5:
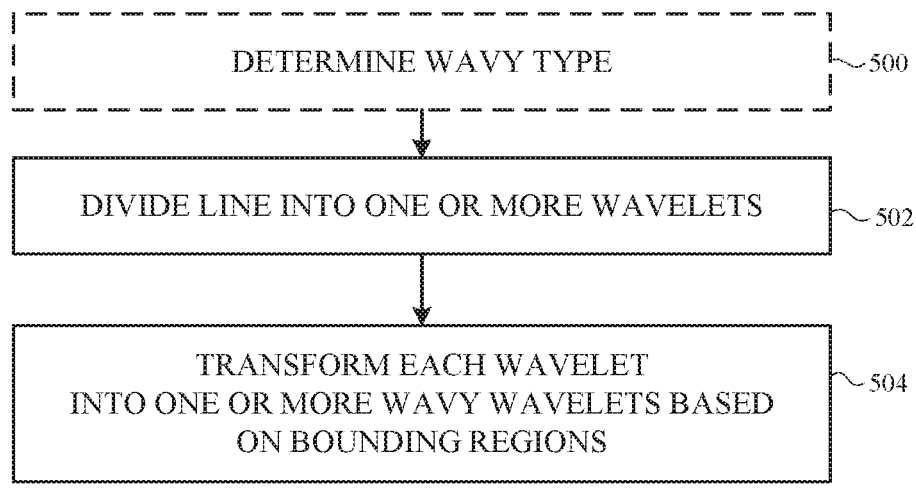
FIG. 5 is a flowchart of an example method of transforming a line into a wavy line.

FIG. 5 is a flowchart of an example method of transforming a line into a wavy line. FIG. 5 will be described in conjunction with FIGS. 6A-6D. Initially, as shown in optional block 500, a wavy type for a shape may be determined. A wavy type is associated with the effect to be achieved. Any suitable wavy type can be used. For example, a wavy type can be freehand, where a shape (e.g., an original line) is transformed into a wavy shape that appears to be drawn by hand.

Another wavy type may be curved, where a shape is transformed into a curved shape. With the curve wavy type, the entire length of a shape (e.g., an original line) becomes a Bezier curve. In another example, a wavy type can be scribble, where a shape (e.g., an original line) appears as if it has been scribbled (e.g., drawn carelessly or hurriedly).

In some embodiments, a wavy type for an original line can be defined with a constant value that can be used to determine the number of wavelets to separate the original line into, the bounding region for one endpoint, and the bounding region for the second endpoint of the line. Other constraints for placement of a control point associated with an endpoint can be added, such as an optional Boolean FSmooth. The Boolean FSmooth ensures the first control point is placed exactly opposite about the endpoint from the previous segment's second control point, causing the resulting wavy line to look smoother. Block 500 can be omitted in other embodiments.

Next, as shown in block 502, the original line is divided into one or more wavelets. A wavelet can have a length that is only a portion of the entire length of the original line or the length of the wavelet may be the entire length of the line (e.g., a wavelet is the original line). In one embodiment, the number of wavelets is based on the length of the original line. In another example, the number of wavelets is a factor of the line length and a constant value associated with the wavy type (e.g., a part of the definition of the wavy type). In one embodiment, the constant value is used as a divisor when determining the number of wavelets. In such embodiments, the number of wavelets can be determined by dividing the line length by the constant value.

The wavelets can have the same length or the length of at least one wavelet may differ from the length of another wavelet (e.g., +/−a percentage). The lengths of the wavelets can vary randomly along a line when the wavelets have different lengths. In some instances, a more natural looking wavy shape can be produced when the lengths of the wavelets vary.

In one aspect, the number of wavelets may also be based on the wavy type. For example, the wavy type can define a maximum percentage that a wavelet length can vary from another wavelet length. In some implementations, predetermined numbers of wavelets for different line lengths and wavy types may be created and stored in a memory (e.g., in a database or a lookup table).

Figure 6A:
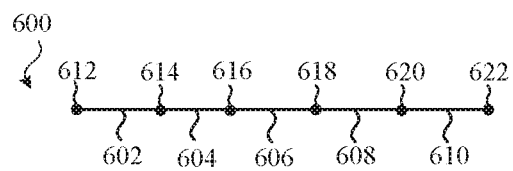
FIGS. 6A-6E illustrate an example first method of producing a wavy line.

FIG. 6A shows an original line 600 divided into wavelets 602, 604, 606, 608, 610. The points 612, 614, 616, 618, 620, 622 represent the endpoints of the wavelets. The wavelet 602 has a first endpoint 612 and a second endpoint 614. The wavelet 604 has a first endpoint 614 and a second endpoint 616. The wavelet 606 has a first endpoint 616 and a second endpoint 618. The wavelet 608 has a first endpoint 618 and a second endpoint 620. The wavelet 610 has a first endpoint 620 and a second endpoint 622.

One or more wavelets 602, 604, 606, 608, 610 is then transformed into a wavy wavelet at block 504. In one aspect, each wavelet becomes a Bezier curve. In one embodiment, each wavelet 602, 604, 606, 608, 610 is transformed into a wavy wavelet that has one or more curves. This example process can be performed for each individual original line in a shape.

Other embodiments can add blocks, omit blocks, modify blocks, or rearrange the blocks shown in FIG. 5. For example, in some embodiments, block 500 may be omitted. Additionally or alternatively, instead of processing each original line and/or original Bezier curve iteratively, the method can be modified to process two or more original lines and/or original Bezier curves in parallel.

Figure 6B:
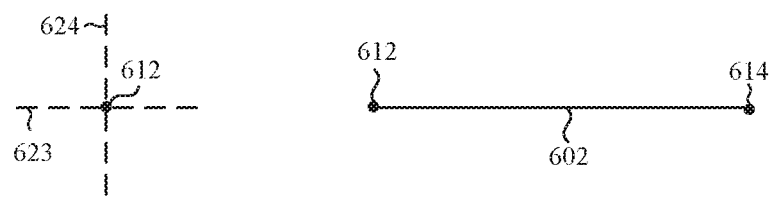
Figure 6C:
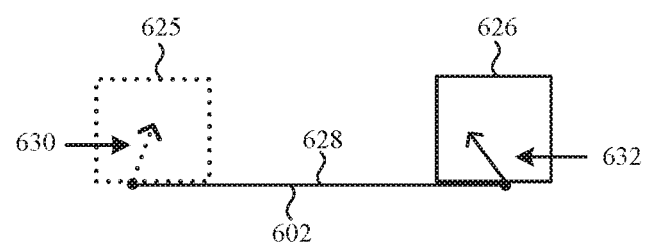

FIGS. 6B and 6C depict an example technique for changing a wavelet into a wavy wavelet. In one embodiment, each wavelet is processed as a horizontal line. Thus, when a wavelet in a document is not horizontal (e.g., is vertical or is at an angle), the wavelet is transformed into a separate coordinate space and processed as a horizontal line in the separate coordinate space. As shown in FIG. 6B, two perpendicular lines 623, 624 in the separate coordinate space are used to determine the orientation and position of a bounding region in the separate coordinate space. For example, the endpoint 612 for the wavelet 602 is treated as the origin of the perpendicular lines 623, 624. In the illustrated embodiment, the endpoint 612 is positioned at point (0, 0). The remaining endpoints 614, 616, 618, 620, 622 are positioned at different points. For example, when the length of each wavelet 602, 604, 606, 608, 610 is 100, the endpoint 614 is positioned at (100, 0) in the separate coordinate space.

For purposes of this description, the line 623 is referred to as the x'-axis and the line 624 as the y'-axis, where the apostrophe represents the separate coordinate space. The size, shape, and/or position of a first bounding region 625 (see FIG. 6C) for the endpoint 612 is determined based on the two perpendicular lines 623, 624. For example, in one embodiment, the first bounding region 625 is determined as a percentage of the length of the wavelet 602. For example, measuring from the origin (e.g., the endpoint 612), the width of the first bounding region 625 can be between 10% and 50% of the wavelet length with respect to the x'-axis, and the height of the first bounding region 625 can be between −5% and 5% of the wavelet length with respect to the y'-axis. The four values [10, 50], [−5, 5] define the location of the first bounding region 625 in the separate coordinate space. The same process is used with each endpoint 614, 616, 618, 620, 622, with the same width and height values (e.g., four values) that are used for the first bounding region 625 or with at least one different value (e.g., width or height).

When the bounding regions are determined for the endpoints 612, 614, 616, 618, 620, 622, each control point associated with the endpoints 612, 614, 616, 618, 620, 622 is positioned within a respective bounding region. When generating a wavy line, one or more control points are moved and positioned within a respective bounding region. In one embodiment, the control points are positioned randomly with the bounding regions. For each bounding region, a reference point (x', y') in the separate coordinate space is determined by the position of a control point within the bounding region. The reference point (x', y') can have a positive or negative x' value and a positive or negative y' value. The reference point (x', y') in the separate coordinate space is then transformed into an actual point in the original coordinate space (the space associated with the shape in the document).

In a non-limiting example, the reference point (x', y') is converted into an actual point in the original coordinate space using vectors. For example, the endpoints of the original wavelet (e.g., wavelet 602) are subtracted from each other to produce a first vector. The first vector is normalized to be a single unit length first vector. The normal of the single unit length first vector is computed to produce a single unit length second vector that is perpendicular to the single unit length first vector. The single unit length first and second vectors are used to represent the reference point (x', y') in the original coordinate space. The single unit length first vector is multiplied by the x' and the single unit length second vector is multiplied by the point y' to produce a final vector that points to the actual point in the original coordinate space. The final vector is added to the origin (e.g., the endpoint 612) to obtain the actual point in the original coordinate space.

In a non-limiting example, for a horizontal line having an endpoint at (0, 0) and a length of 100 units, and using the bounding region of [10% to 50%], [−5% to 5%], the x' minimum is 10, the x' maximum is 50, the y' minimum is −5, and the y' maximum is 5. For the endpoint (0, 100) and a bounding region of [−50% to 10%], [−5% to 5%], the x' minimum is 50, the x' maximum is 90, the y' minimum is −5, and the y' maximum is 5.

Thus, in this example embodiment, the bounding regions and the reference points are determined in the separate coordinate space and only the reference points are converted into the original coordinate space to produce the positions of the actual points in the original coordinate space. Defining each bounding region as a percentage of the length of the respective wavelet transforms the line (or the wavelet) and the coordinate endpoint 612 into the minimum and maximum x' and y' coordinate values for the resulting random point.

FIG. 6C depicts example first and second bounding regions for the endpoints 612, 614, respectively. The first bounding region 625 and a second bounding region 626 are positioned (e.g., over, under, or around) with respect to each endpoint 612, 614 of the wavelet 602. Each of the first and the second bounding regions 625, 626 can have any given size, shape and/or position with respect to the wavelet 602. For example, in FIG. 6C, the first and the second bounding regions 625, 626 have the same sized rectangular shape and are positioned on a first side 628 of the wavelet 602 (e.g., above or over the wavelet 602). Although each bounding region 625, 626 is shown as a rectangle having one size, other embodiments are not limited to this shape and size. The first and the second bounding regions 625, 626 can have any shape, such as a circle, and any size. The first and the second bounding regions 625, 626 can both have the same shape or different shapes, and the bounding regions 625, 626 can both have the same size or different sizes.

As shown in FIG. 6C, the wavelet 602 has two control points 630, 632 that are associated with the endpoints 612, 614 of the wavelet 602. The control points 630, 632 are implemented as arrows in FIG. 6C, although other embodiments are not limited to the use of arrows. The wavelet 602 is perturbed by moving one or both control points 630, 632 (e.g., arrows) randomly within a respective bounding region 625, 626 to produce one or more curves in the wavelet 602. The first and the second bounding regions 625, 626 constrain the movement of the control points 630, 632 in that the movement of each control point 630, 632 is limited to the area within the first or second bounding region 625, 626. For example, as shown in FIG. 6C, the first control point 630 (e.g., arrow) can be moved to any position within the first bounding region 625 and the second control point 632 can be moved to any position within the second bounding region 626. How much the wavelet 602 curves or distorts is based on the position of the control point 630 within the first bounding region 625 and the position of the control point 632 in the second bounding region 626. Curves in the wavelets 604, 606, 608, 610 are created using the same process of moving one or more control points of each wavelet within a respective bounding region.

Figure 6D:
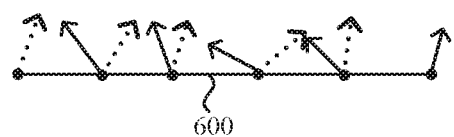
Figure 6E:

FIG. 6D illustrates the original line 600 and the positions of the control points (e.g., arrows) of each wavelet 602, 604, 606, 608, 610. In FIG. 6D, the first control points of the bounding regions associated with the left endpoints of the wavelets 602, 604, 606, 608, 610 have a dash pattern (similar to the dash pattern of the first bounding region 625), and the second control points of the bounding regions associated with the right endpoints of the wavelets 602, 604, 606, 608, 610 are non-dashed arrows (similar to the non-dashed lines of the second bounding region 626). The positioning of the control points produces the wavy line 634 in FIG. 6E. Because the bounding regions are positioned on one side 628 of the original line 600 (in the separate coordinate space), the wavy line 634 has a scalloped look. In general, the "look" or waviness of an wavy line is based on the length of the original line, the number of wavelets, the positions of the bounding regions with respect to the endpoints of each wavelet, the sizes and/or shapes of the bounding regions, and the random positions of the control points within the bounding regions. In some embodiments, the waviness can also be based on the wavy type of the shape, which can influence or determine the number of wavelets and/or the positions, shapes, and/or sizes of the bounding regions.

Figure 7A:
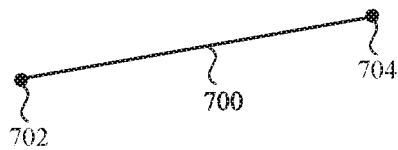
FIGS. 7A-7C depict an example second method of producing a wavy line.
Figure 7B:
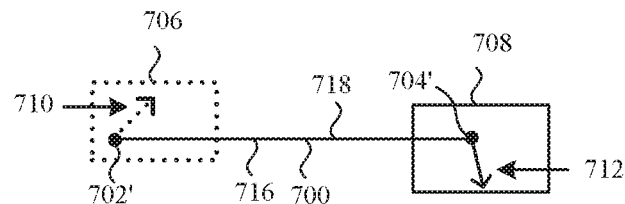
Figure 7C:
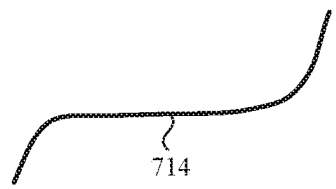

FIGS. 7A-7C depict an example second method of producing a wavy line. In the illustrated embodiment, the entire line 700 is treated as a wavelet. In the original coordinate space, the wavelet 700 is a non-horizontal line that is positioned at an angle. The wavelet 700 has endpoints 702, 704.

In FIG. 7B, the wavelet 700 is transformed into a separate coordinate space to allow the wavelet 700 to be processed as a horizontal line. A first bounding region 706 has a first size and is positioned at a first location with respect to the endpoint 702. The second bounding region 708 has a larger second size and is positioned at a different second location with respect to the endpoint 704. The control points 710, 712 are positioned randomly within the first and the second bounding regions 706, 708, respectively. As discussed in more detail in conjunction with FIG. 6B, the position of each control point 710, 712 produces a reference point (x', y') in the separate coordinate space. The reference points are transformed into the actual points in the original coordinate space to determine the locations of the actual points in the original coordinate space.

FIG. 7C shows the wavelet 700 transformed into a wavy wavelet 714 (e.g., a wavy line since the entire line is treated as a wavelet) based on the positions of the first and the second bounding regions 706, 708 and the positions of the control points 710, 712 within the first and second bound regions 706, 708. Because the first and the second bounding regions 710, 712 are positioned on both sides 716, 718 of the wavelet 700 (see FIG. 7B), the wavy wavelet 714 has an undulating look or form.

Figure 8:
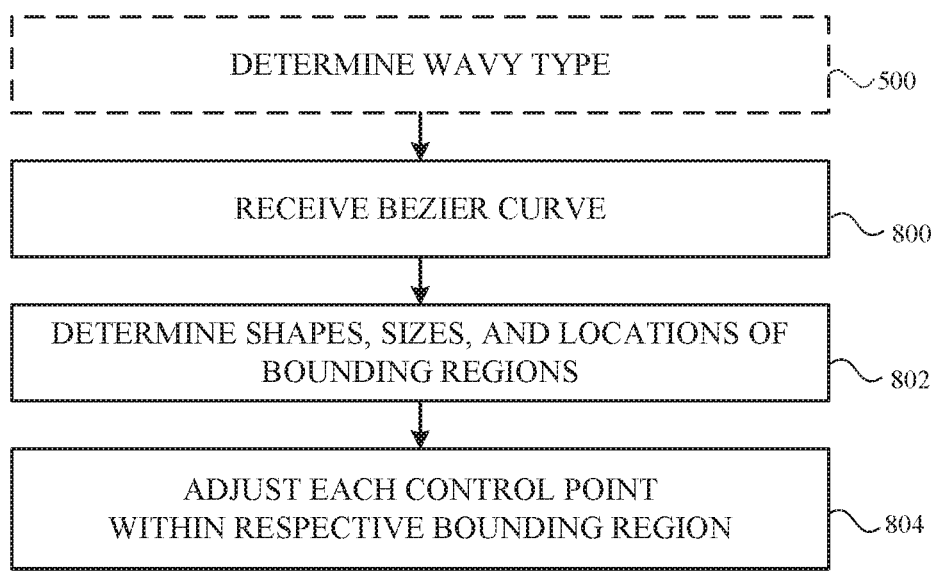
FIG. 8 is a flowchart of an example method of adjusting the control points of a Bezier curve to produce a wavy Bezier curve.

FIG. 8 is a flowchart of an example method of adjusting the control points of a Bezier curve to produce a wavy Bezier curve. Initially, as shown in block 500, an wavy type for the shape may be determined. Block 500 is optional and can be omitted in other embodiments.

An original Bezier curve is received and a shape and a size (e.g., area) of a bounding region for each endpoint (e.g., arrow) of the Bezier curve is determined (blocks 800, 802). In an example embodiment, the bounding regions are circular bounding regions and a minimum (MIN) and a maximum (MAX) radius for each control point (e.g., arrow) associated with the endpoints are determined. Essentially, the area between the MIN and MAX radii form a bounding region for the control point. In other embodiments, the bounding regions can have the same shape or different shapes, and/or the bounding regions can have the same size or different sizes.

Each control point (e.g., arrow) is then moved randomly within the bounding region associated with a respective endpoint (bock 804). This example process can be performed for each individual original Bezier curve in a shape.

Figure 9A:
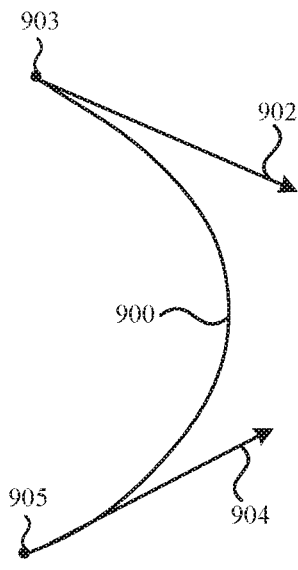
FIGS. 9A-9D illustrate the method of adjusting the control points of a Bezier curve.
Figure 9B:
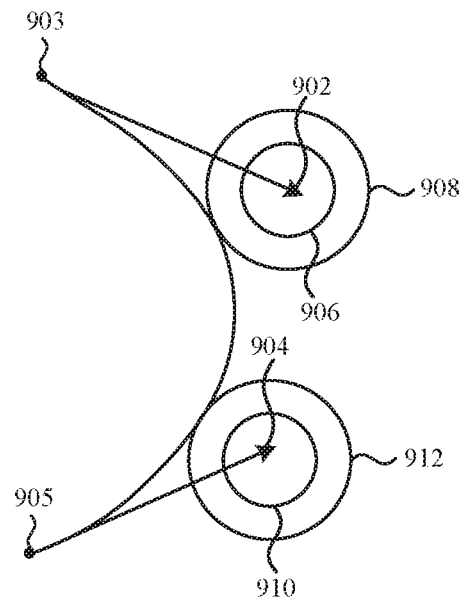

FIGS. 9A-9D illustrate the method of adjusting the control points of a Bezier curve. A Bezier curve 900 is shown in FIG. 9A. In the illustrated embodiment, the first control point 902 and the second control point 904 are implemented with arrows. As shown in FIG. 9B, a MIN radius 906 and a MAX radius 908 are determined for the first control point 902 associated with the endpoint 903. The MIN and MAX radii 906, 908 form a bounding region for the control point 902. A MIN radius 910 and a MAX radius 912 are also determined for the second control point 904 associated with the endpoint 905. The MIN and MAX radii 910, 912 form a bounding region for the control point 904. The MIN and MAX radii for each control point 902, 904 can have the same lengths or at least one of the lengths can differ from the other lengths. The bounding regions for the first and the second control points 902, 904 (e.g., arrows) can have the same size (e.g., area) or different sizes.

Figure 9C:
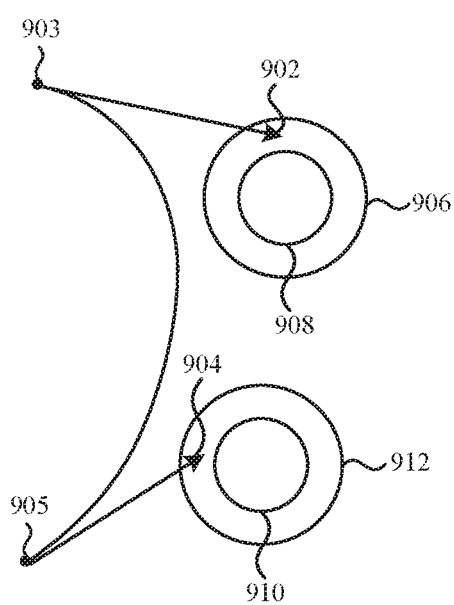
Figure 9D:
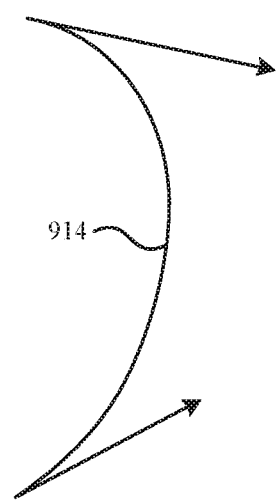

As shown in FIG. 9B, the control points 902, 904 are not initially positioned within the bounding regions (before the control points 902, 904 are moved). In other embodiments, one or both control points 902, 904 can be initially positioned within a respective boundary region. One or both of the first and the second control points 902, 904 (e.g. arrows) are moved randomly within a respective bounding region to produce a wavy Bezier curve. In FIG. 9C, the first control point 902 is moved randomly within the bounding region formed by the MIN radius 906 and the MAX radius 908, and the second control point 904 is moved randomly within the bounding region formed by the MIN radius 910 and the MAX radius 912. The random placements of the first control point 902 and the second control point 904 within their respective bounding regions produce the example wavy Bezier curve 914 shown in FIG. 9D. Compared to the original Bezier curve 900 in FIG. 9A, the form of the wavy Bezier curve 914 is distorted.

In some instances, the endpoints of a Bezier curve can be turned into one of three types; corner, straight, and smooth. Corner means there are no rules that constrain where the control points on either side of the endpoint are, relative to each other. Straight means the two control points will form a straight line through the endpoints. Smooth means the two endpoints will make a straight line through the endpoints and be equal distance from the endpoints.

Different wavy Bezier curves can be created in other embodiments. In general, the waviness of a wavy Bezier curve is based on the size of the bounding regions (e.g., the lengths of the MIN radii and the lengths of the MAX radii) and the random positions of the first and the second control points within their respective bounding regions. In some instances, the waviness of a wavy type may also be based on a wavy type associated with the shape because the wavy type can influence or determine the size of the bounding regions (e.g., the length(s) of the MIN and MAX radii). For example, a wavy type for a Bezier curve can be defined with the MIN and MAX values for perturbing the control points of the original Bezier curve.

Figure 10A:
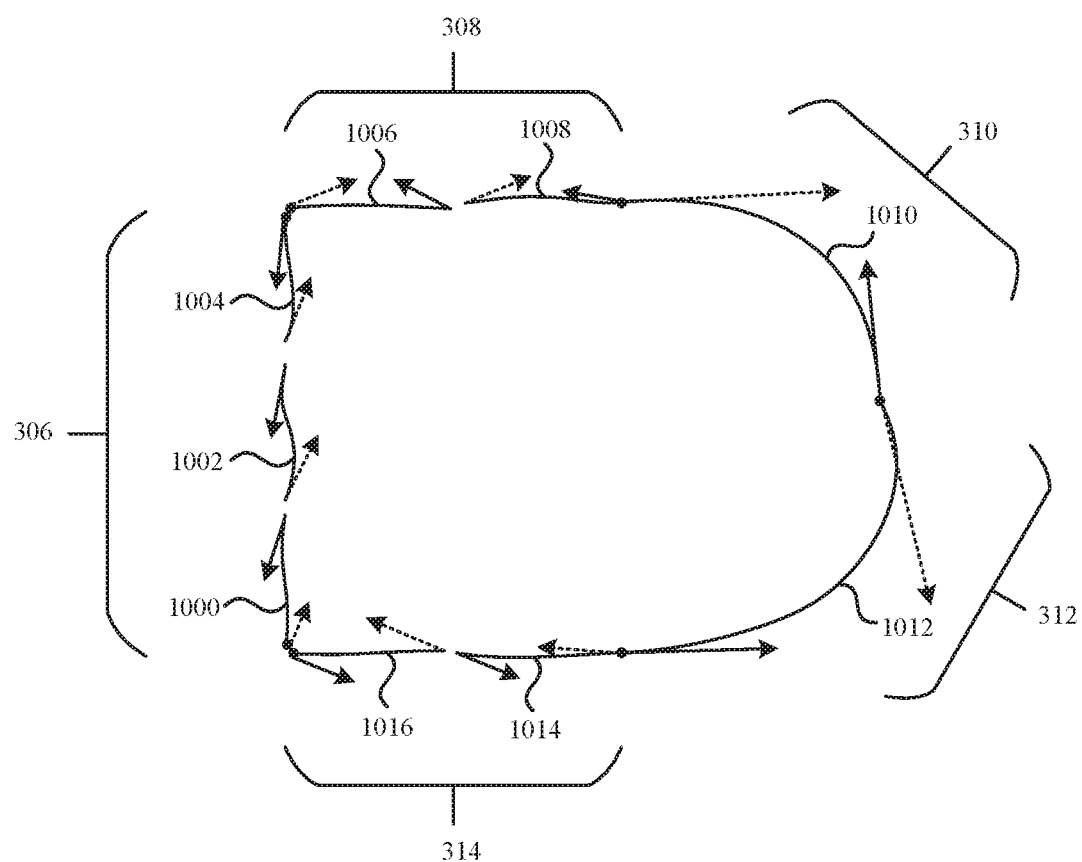
FIG. 10A depicts example wavy wavelets and example wavy Bezier curves for the example shape shown in FIG. 3A.
Figure 10B:
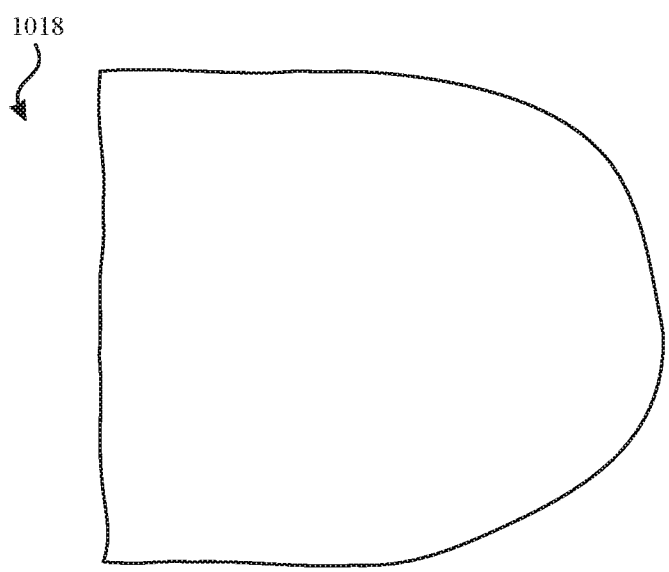
FIG. 10B illustrates the shape in FIG. 10A as a wavy shape.

FIG. 10A depicts example wavy wavelets and example wavy Bezier curves for the example shape shown in FIG. 3. The original line 306 has been divided into three wavelets and the control points associated with the endpoints of each wavelet have been moved randomly to produce wavy wavelets 1000, 1002, 1004. The original line 308 has been divided into two wavelets and the control points associated with the endpoints of each wavelet have been positioned randomly to produce wavy wavelets 1006, 1008. The control points associated with the endpoints of the original Bezier curve 310 have been moved randomly to produce a wavy Bezier curve 1010. The control points associated with the endpoints of the original Bezier curve 312 have been adjusted randomly to produce a wavy Bezier curve 1012. The original line 314 has been divided into two wavelets and the control points associated with the endpoints of each wavelet have been positioned randomly to produce wavy wavelets 1014, 1016. Collectively, the wavy wavelets 1000, 1002, 1004, 1006, 1008, 1014, 1016 and the wavy Bezier curves 1010, 1012 produce the wavy shape 1018 shown in FIG. 10B. Comparing the wavy shape 1018 with the original shape 300 shown in FIG. 3A, the wavy shape 1018 appears more rough, uneven, and hand drawn.

One advantage of using bounding regions when creating wavy shapes is increased flexibility. The bounding regions generalize and parametrize the software of a diagramming application or other application (e.g., the programming code). For example, the same code can be used to create a variety of different effects by adding new wavy types or wavy type parameters. Additionally or alternatively, transforming a wavelet or Bezier curve into a separate coordinate space and processing the wavelet or Bezier curve as if the wavelet or Bezier curve are horizontal allows the wavelet(s) and/or Bezier curve(s) in the shape to look consistent. Moreover, the form of an original line or Bezier curve can be disrupted or modified to include one or more curves, one or more loops, a single arc, one or more spikes, and/or regular or irregular waviness.

Figure 11:
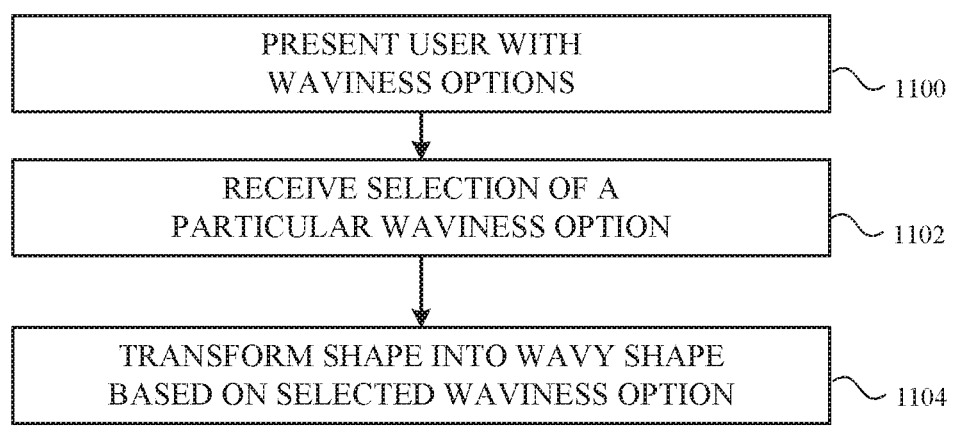
FIG. 11 is a flowchart of a method of selecting a waviness level for a wavy shape.

FIG. 11 is a flowchart of a method of selecting a waviness level for a wavy shape. Initially, as shown in block 1100, a user is presented with multiple waviness options. Each waviness option can be associated with a level or degree of waviness. Additionally or alternatively, a user may want the shape to include one or more loops, a single arc, and/or one or more spikes. In a non-limiting embodiment, sliders, dialog boxes, and/or buttons can be displayed in a user interface and used to select a particular waviness option.

Next, as shown in block 1102, a selection of a particular waviness option is received. For example, the user can position a slider at a location that corresponds to a particular level of waviness, or the user may enter or select the width and/or height values of one or more bounding regions (e.g., [x1 to x2], [y1 to y2]). The shape is then transformed into a wavy shape, where the waviness of the wavy shape corresponds to the selected waviness option (block 1104).

Figure 12:
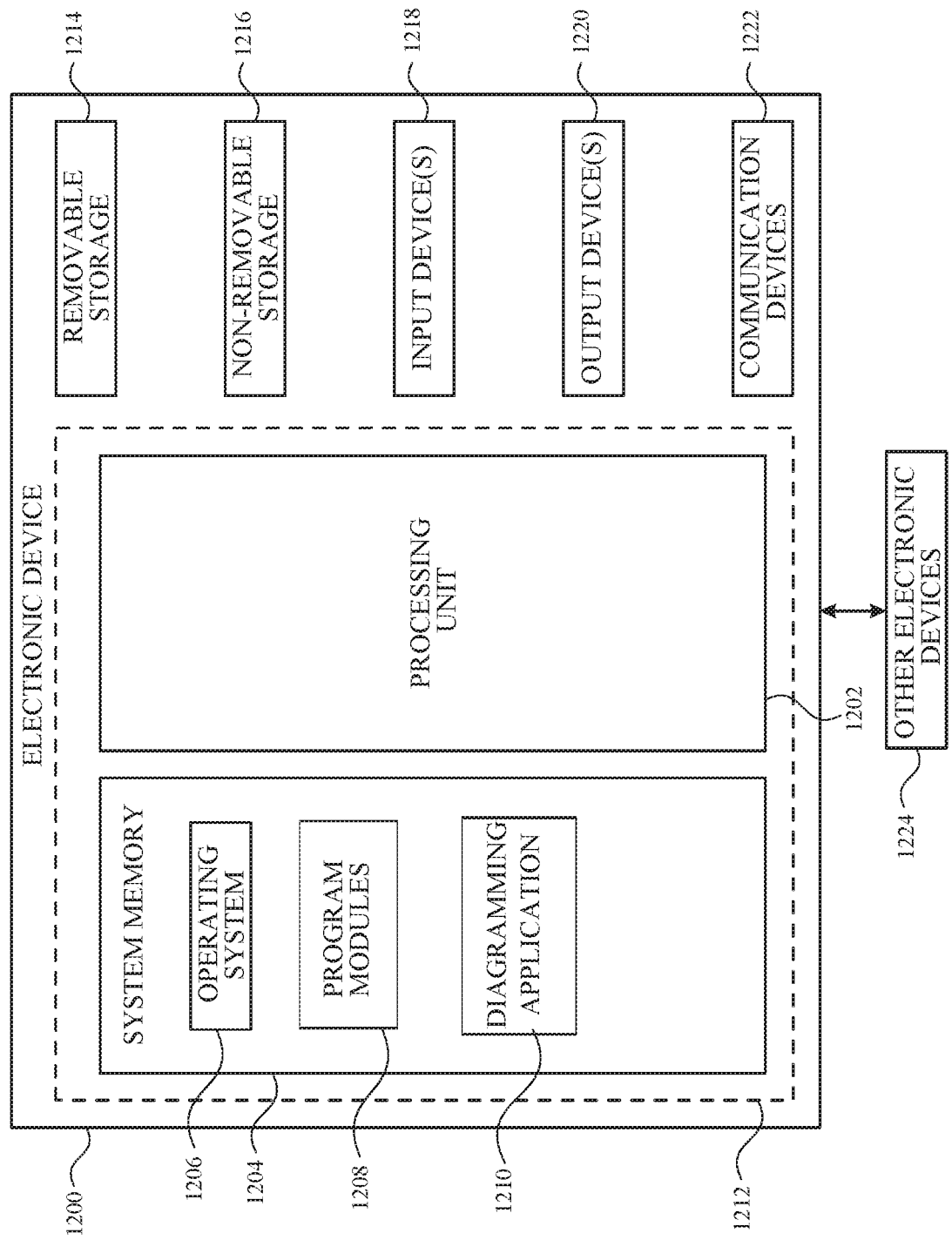
FIG. 12 is a block diagram depicting example physical components of a computing device with which aspects of the disclosure may be practiced.
Figure 13A:
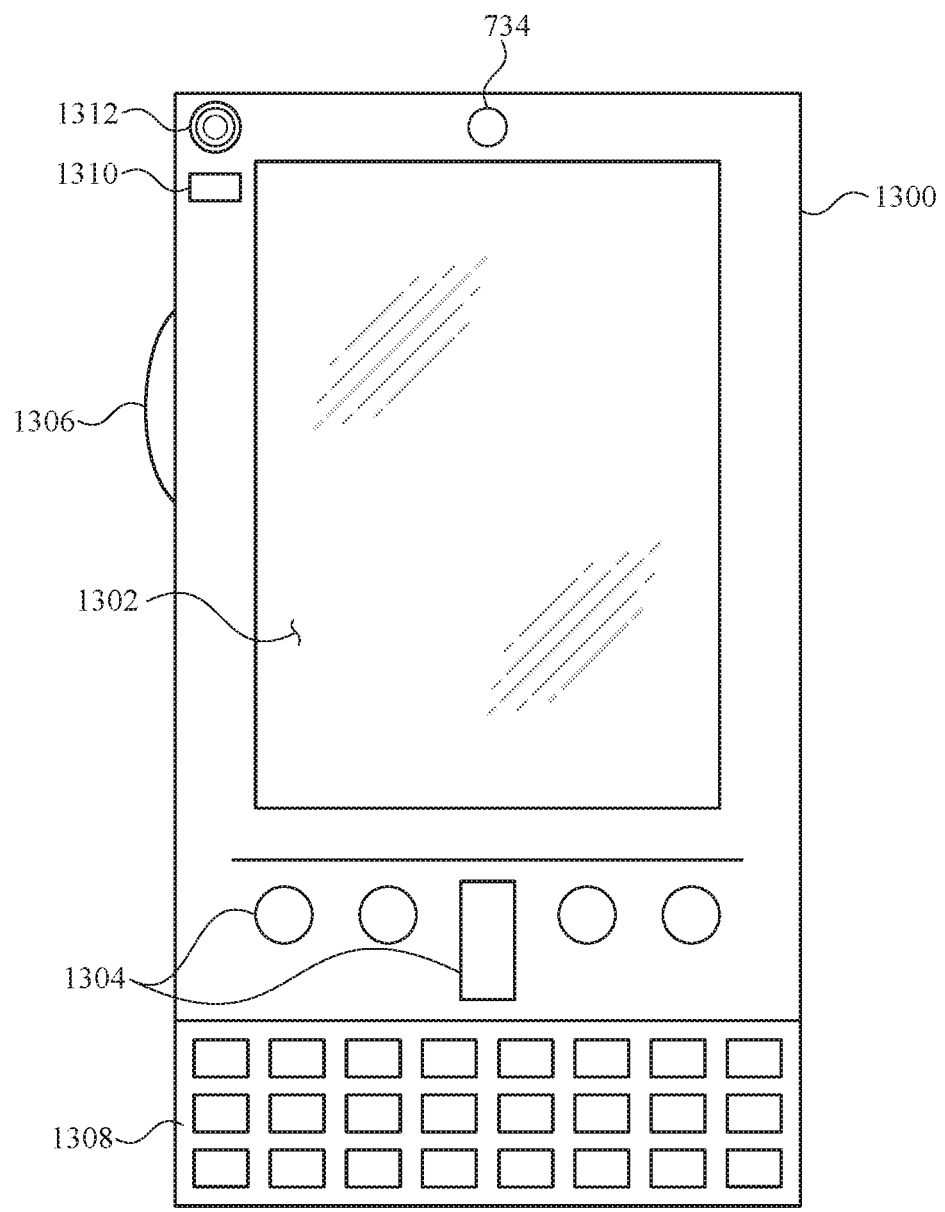
FIGS. 13A-13B are simplified block diagrams illustrating a mobile computing device with which aspects of the present disclosure may be practiced.
Figure 13B:
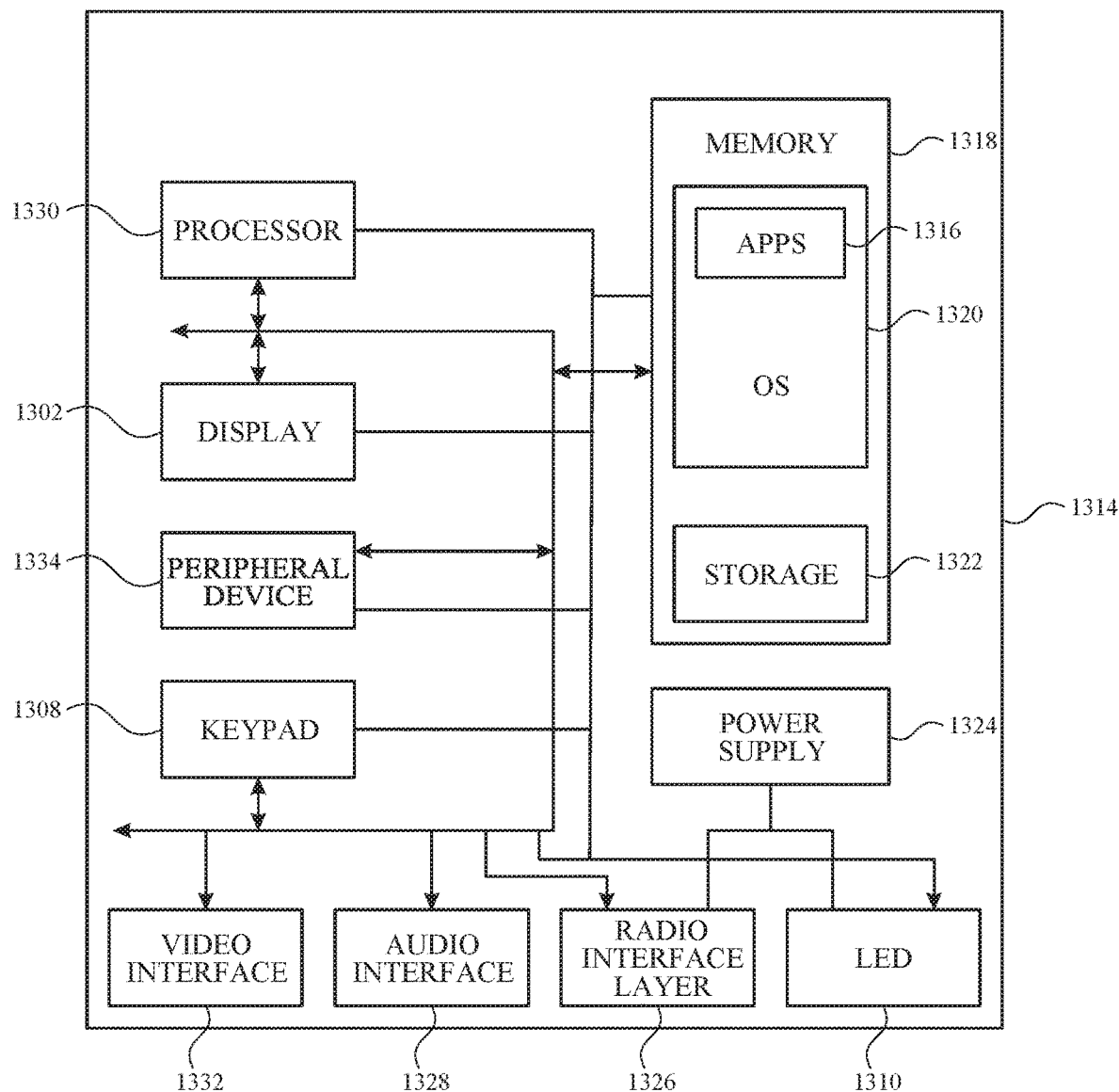
Figure 14:
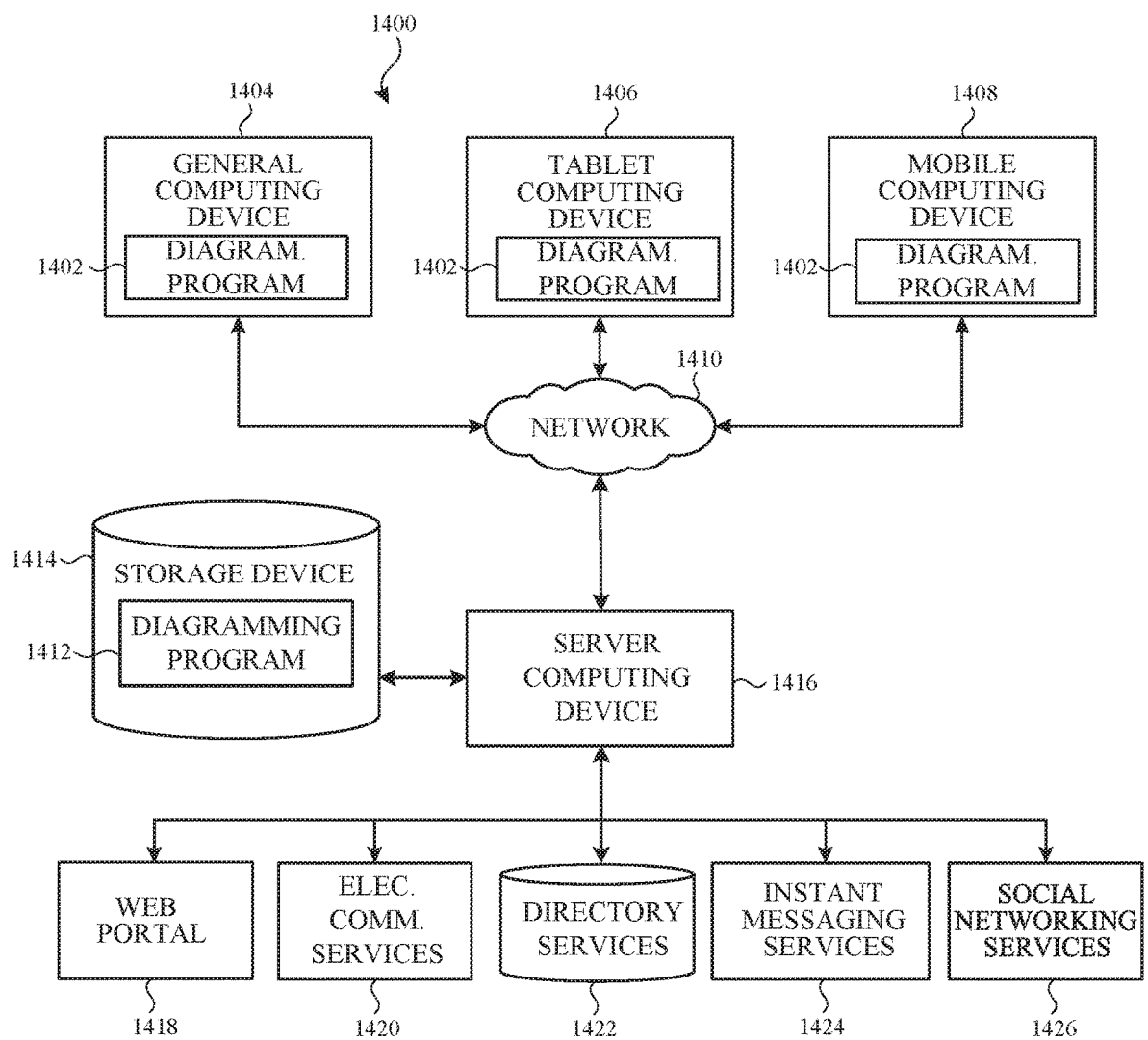
FIG. 14 is a block diagram depicting a distributed computing system in which aspects of the present disclosure may be practiced.

FIGS. 12-14 and the associated descriptions provide a discussion of a variety of operating environments in which aspects of the disclosure may be practiced. However, the devices and systems illustrated and discussed with respect to FIGS. 12-14 are for purposes of example and illustration and are not limiting of a vast number of electronic device configurations that may be utilized for practicing aspects of the disclosure, as described herein.

FIG. 12 is a block diagram illustrating physical components (e.g., hardware) of an electronic device 1200 with which aspects of the disclosure may be practiced. In a basic configuration, the electronic device 1200 may include at least one processing device 1202 and a system memory 1204. Any suitable processing device 1202 can be used. For example, the processing device 1202 may be a central processing unit, a microprocessor, an application specific integrated circuit, a field programmable gate array, a graphics processing unit, or combinations thereof.

Depending on the configuration and type of the electronic device 1200, the system memory 1204 may comprise, but is not limited to, volatile storage (e.g., random access memory), non-volatile storage (e.g., read-only memory), flash memory, or any combination of such memories. The system memory 1204 may include a number of program modules and data files, such as an operating system 1206, one or more program modules 1208 suitable for parsing received input, determining subject matter of received input, determining actions associated with the input and so on, and a diagramming application 1210. While executing on the processing device 1202, the diagramming application 1210 may perform and/or cause to be performed processes including, but not limited to, the aspects as described herein.

The operating system 1206, for example, may be suitable for controlling the operation of the electronic device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1212.

The electronic device 1200 may have additional features or functionality. For example, the electronic device 1200 may also include additional data storage devices (removable and/or non-removable) such as, for example, magnetic disks, optical disks, or tape. Such additional storage is illustrated in FIG. 12 by a removable storage device 1214 and a non-removable storage device 1216.

The electronic device 1200 may also have one or more input device(s) 1218 such as a keyboard, a trackpad, a mouse, a pen, a sound or voice input device, a touch, force and/or swipe input device, etc. The output device(s) 1220 such as a display, speakers, a printer, etc. may also be included. The aforementioned devices are examples and others may be used. The electronic device 1200 may include one or more communication devices 1222 allowing communications with other electronic devices 1224. Examples of suitable communication devices 1222 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1204, the removable storage device 1214, and the non-removable storage device 1216 are all computer storage media examples (e.g., memory storage or storage device). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1200. Any such computer storage media may be part of the electronic device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing devices, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

FIGS. 13A and 13B illustrate a mobile electronic device 1300, for example, a mobile telephone, a smart phone, wearable computer (such as a smart watch), a tablet computer, a laptop computer, and the like, with which embodiments of the disclosure may be practiced. With reference to FIG. 13A, one aspect of a mobile electronic device 1300 for implementing the aspects is illustrated.

In a basic configuration, the mobile electronic device 1300 is a handheld computer having both input elements and output elements. The mobile electronic device 1300 typically includes a display 1302 and one or more input buttons 1304 that allow the user to enter information into the mobile electronic device 1300. The display 1302 of the mobile electronic device 1300 may also function as an input device (e.g., a display that accepts touch and/or force input).

If included, an optional side input element 1306 allows further user input. The side input element 1306 may be a rotary switch, a button, or any other type of manual input element. In alternative aspects, mobile electronic device 1300 may incorporate more or less input elements. For example, the display 1302 may not be a touch screen in some embodiments. In yet another alternative embodiment, the mobile electronic device 1300 is a portable phone system, such as a cellular phone. The mobile electronic device 1300 may also include an optional keypad 1308. Optional keypad 1308 may be a physical keypad or a "soft" keypad generated on the touch screen display.

In various embodiments, the output elements include the display 1302 for showing a graphical user interface (GUI) of a diagramming program, a visual indicator 1310 (e.g., a light emitting diode), and/or an audio transducer 1312 (e.g., a speaker). In some aspects, the mobile electronic device 1300 incorporates a vibration transducer for providing the user with tactile feedback. In yet another aspect, the mobile electronic device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one aspect of a mobile electronic device 1300. That is, the mobile electronic device 1300 can incorporate a system (e.g., an architecture) 1314 to implement some aspects. In one embodiment, the system 1314 is implemented as a "smart phone" capable of running one or more applications (e.g., browser, e-mail, calendaring, contact managers, messaging clients, games, media clients/players, diagramming applications, and sharing applications and so on). In some aspects, the system 1314 is integrated as an electronic device, such as an integrated personal digital assistant (PDA) and wireless phone.

One or more application programs 1316 may be loaded into the memory 1318 and run on or in association with the operating system 1320. Examples of the application programs include phone dialer programs, e-mail programs, diagramming programs, personal information management (PIM) programs, word processing programs, spreadsheet programs, Internet browser programs, messaging programs, and so forth.

The system 1314 also includes a non-volatile storage area 1322 within the memory 1318. The non-volatile storage area 1322 may be used to store persistent information that should not be lost when the system 1314 is powered down.

The application programs 1316 may use and store information in the non-volatile storage area 1322, such as diagrams or presentations used by a diagramming application, and the like. A synchronization application (not shown) also resides on the system 1314 and is programmed to interact with a corresponding synchronization application resident on a host computer to keep the information stored in the non-volatile storage area 1322 synchronized with corresponding information stored at the host computer.

The system 1314 has a power supply 1324, which may be implemented as one or more batteries. The power supply 1324 may further include an external power source, such as an AC adapter or a powered docking cradle that supplements or recharges the batteries.

The system 1314 may also include a radio interface layer 1326 that performs the function of transmitting and receiving radio frequency communications. The radio interface layer 1326 facilitates wireless connectivity between the system 1314 and the "outside world," via a communications carrier or service provider. Transmissions to and from the radio interface layer 1326 are conducted under control of the operating system 1320. In other words, communications received by the radio interface layer 1326 may be disseminated to the application programs 1316 via the operating system 1320, and vice versa.

The visual indicator 1310 may be used to provide visual notifications, and/or an audio interface 1328 may be used for producing audible notifications via an audio transducer (e.g., audio transducer 1312 illustrated in FIG. 13A). In the illustrated embodiment, the visual indicator 1310 is a light emitting diode (LED) and the audio transducer 1312 may be a speaker. These devices may be directly coupled to the power supply 1324 so that when activated, they remain on for a duration dictated by the notification mechanism even though the processor 1330 and other components might shut down for conserving battery power. The LED may be programmed to remain on indefinitely until the user takes action to indicate the powered-on status of the device.

The audio interface 1328 is used to provide audible signals to and receive audible signals from the user (e.g., voice input such as described above). For example, in addition to being coupled to the audio transducer 1312, the audio interface 1328 may also be coupled to a microphone to receive audible input, such as to facilitate a telephone conversation. In accordance with embodiments of the present disclosure, the microphone may also serve as an audio sensor to facilitate control of notifications, as will be described below.

The system 1314 may further include a video interface 1332 that enables an operation of peripheral device 1334 (e.g., on-board camera) to record still images, video stream, and the like.

A mobile electronic device 1300 implementing the system 1314 may have additional features or functionality. For example, the mobile electronic device 1300 may also include additional data storage devices (removable and/or non-removable) such as, magnetic disks, optical disks, or tape. Such additional storage is illustrated in FIG. 13B by the non-volatile storage area 1322.

Data/information generated or captured by the mobile electronic device 1300 and stored via the system 1314 may be stored locally on the mobile electronic device 1300, as described above, or the data may be stored on any number of storage media that may be accessed by the mobile electronic device 1300 via the radio interface layer 1326 or via a wired connection between the mobile electronic device 1300 and a separate electronic device associated with the mobile electronic device 1300, for example, a server-computing device in a distributed computing network, such as the Internet (e.g., server computing device 1418 in FIG. 14). As should be appreciated such data/information may be accessed via the mobile electronic device 1300 via the radio interface layer 1326 or via a distributed computing network. Similarly, such data/information may be readily transferred between electronic devices for storage and use according to well-known data/information transfer and storage means, including electronic mail and collaborative data/information sharing systems.

As should be appreciated, FIG. 13A and FIG. 13B are described for purposes of illustrating the present methods and systems and is not intended to limit the disclosure to a particular sequence of steps or a particular combination of hardware or software components.

FIG. 14 is a block diagram illustrating a distributed system in which aspects of the disclosure may be practiced. The system 1400 allows a user to produce drawings, presentations, or other diagrams using a diagramming program 1402 in a general computing device 1404 (e.g., a desktop computer), a tablet computing device 1406, and/or a mobile computing device 1408. The general computing device 1404, the tablet computing device 1406, and the mobile computing device 1408 can each include the components, or be connected to the components, that are shown associated with the electronic device 1200 in FIG. 12 or the mobile electronic device 1300 in FIGS. 13A and 13B.

The general computing device 1404, the tablet computing device 1406, and the mobile computing device 1408 are each configured to access one or more networks (represented by network 1410) to interact with a diagramming application 1412 stored in one or more storage devices (represented by storage device 1414) and executed on one or more server computing devices (represented by server computing device 1416). In some aspects, the server computing device 1416 can access and/or receive various types of services, communications, documents and information transmitted from other sources, such as a web portal 1418, an electronic communications services 1420, directory services 1422, instant messaging and/or text services 1424, and/or social networking services 1426. In some instances, these sources may provide robust reporting, analytics, data compilation and/or storage service, etc., whereas other services may provide search engines or other access to data and information, images, graphics, videos, document processing and the like.

As should be appreciated, FIG. 14 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method of producing a wavy shape, comprising:
   separating the shape into at least one individual original line and at least one individual original Bezier curve, wherein the at least one original line is a straight non-horizontal line and at least one original Bezier curve is a smooth Bezier curve;

for each original line:
  dividing the original line into a plurality of wavelets;
  transforming the plurality of wavelets from an original coordinate space into a separate coordinate space to produce a plurality of horizontal wavelets;
  for each horizontal wavelet in the plurality of horizontal wavelets:
    moving a first control point of a first endpoint of the horizontal wavelet from an initial point to a first point within first bounding region associated with the first endpoint of the horizontal wavelet to produce an amount of waviness in the horizontal wavelet; and
  transform the plurality of horizontal wavelets from the separate coordinate space back into the original coordinate space to produce a wavy non-horizontal line;
for each original Bezier curve:
  moving a first control point of a first endpoint of the original Bezier curve from an initial point to a second point within a second bounding region associated with the first endpoint of the original Bezier curve to produce an amount of waviness in the Bezier curve; and
presenting the wavy shape in a user interface of a diagramming application.

2. The method of claim 1, further comprising producing a wavy fill for the wavy shape when an interior area of the wavy shape is to be filled with a fill, the producing comprising: processing a path of the fill to produce the wavy fill, wherein the path of the fill is processed separately from a path of the shape when the wavy shape is produced.

3. The method of claim 1, wherein moving the first control point of the horizontal wavelet comprises randomly positioning the first control point at the first position within the first bounding region.

4. The method of claim 3, wherein a size of the first bounding region differs from a size of a third first bounding region associated with a second endpoint of a respective horizontal wavelet.

5. The method of claim 1, wherein each first bounding region comprises a rectangular bounding region.

6. The method of claim 1, wherein moving the first control point of the original Bezier curve comprises:
  determining a size of the second bounding region for the first endpoint of the original Bezier curve; and
  randomly positioning the first control point at the second point within the second bounding region.

7. The method of claim 1, wherein:
each second bounding region comprises a circular bounding region; and
determining the size of each circular bounding region comprises determining a minimum radius and a maximum radius of each circular bounding region, wherein each second bounding region is disposed between the respective minimum radius and the maximum radius.

8. The method of claim 1, further comprising:
for each horizontal wavelet in the plurality of horizontal wavelets, moving a second control point of a second endpoint of the horizontal wavelet from an initial point to a third point within a third bounding region associated with the second endpoint of the horizontal wavelet; and
moving a second control point of a second endpoint of the Bezier curve from an initial point to a fourth point within a fourth bounding region associated with the second endpoint of the Bezier curve.

9. A system comprising:
a processing device; and
a memory operably connected to the processing device and storing instructions, that when executed by the processing device, cause the system to:
receive a shape;
separate the shape into at least one individual original line and at least one individual original Bezier curve, wherein the at least one original line is a straight non-horizontal line and at least one original Bezier curve is a smooth Bezier curve, to produce a wavy shape by:
for each original line:
  divide the original line into wavelets;
  transform the wavelets from an original coordinate space into a separate coordinate space to produce horizontal wavelets;
  for each horizontal wavelet:
    move a first control point of a first endpoint of the horizontal wavelet from an initial point to a first point within first bounding region associated with the first endpoint of the horizontal wavelet to produce an amount of waviness in the horizontal wavelet; and
    transform the horizontal wavelets from the separate coordinate space back into the original coordinate space to produce a wavy non-horizontal line;
for each original Bezier curve:
  move a first control point of a first endpoint of the original Bezier curve from an initial point to a second point within a second bounding region associated with the first endpoint of the original Bezier curve to produce an amount of waviness in the Bezier curve; and
presenting the wavy shape in a user interface of a diagramming application.

10. The system of claim 9, wherein the memory stores further instructions for causing the system to produce a wavy fill for the wavy shape when an interior area of the wavy shape is to be filled with a fill, the producing comprising: processing a path of the fill to produce the wavy fill, wherein the path of the fill is processed separately from a path of the shape when the wavy shape is produced.

11. The system of claim 9, wherein moving the first control point of the horizontal wavelet comprises:
positioning the first bounding region around the first endpoint of the horizontal wavelet; and
randomly positioning the first control point at the first point within the first bounding region.

12. The system of claim 9, wherein a size of at least one first bounding region differs from a size of another first bounding region.

13. The system of claim 9, wherein:
the first bounding region of a respective horizontal wavelet is positioned at a first location around the first endpoint of the respective horizontal wavelet; and
a third bounding region is positioned around a second endpoint of the respective horizontal wavelet at a different third location around the second endpoint of the respective horizontal wavelet.

14. The system of claim 9, wherein moving the first control point of the original Bezier curve comprises:
determining a size of the second bounding region; and
randomly positioning the first control point at the second point within the second bounding region.

15. The system of claim 9, wherein at least one first bounding region comprises a rectangular bounding region and at least one second bounding region comprises a circular bounding region.

16. The system of claim 9, wherein one wavelet of the original line has a length that differs from a length of another wavelet of the original line.

17. A method of producing a wavy shape, comprising:
separating a shape into at least one individual original line and at least one individual original Bezier curve, wherein each of the at least one original line is a straight non-horizontal line and the at least one original Bezier curve is a smooth Bezier curve;
for each original Bezier curve:
positioning a first bounding region around a first endpoint of the Bezier curve; and
moving a control point associated with the first endpoint of the Bezier curve to a first position within the first bounding region to produce an amount of waviness in the Bezier curve;
for each original line:
dividing the original line into wavelets;
transforming the wavelets from an original coordinate space into a separate coordinate space to produce horizontal wavelets; and
for each horizontal wavelet:
positioning a second bounding region around a first endpoint of the horizontal wavelet; and
moving a control point associated with the first endpoint of the horizontal wavelet to a second position within the second bounding region to produce an amount of waviness in the horizontal wavelet;
transforming the horizontal wavelets from the separate coordinate space back into the original coordinate space to produce a wavy non-horizontal line; and
presenting the wavy shape in a user interface of a diagramming application.

18. The method of claim 17, further comprising producing a wavy fill for the wavy shape when an interior area of the wavy shape is to be filled with a fill, the producing comprising processing a path of fill to produce the wavy fill, wherein the path of the fill is processed separately from a path of the shape when the wavy shape is produced.

19. The method of claim 17, further comprising for each horizontal wavelet, positioning a third bounding region around a second endpoint of the horizontal wavelet, wherein:
the second bounding region is positioned at a first location around the first endpoint of the horizontal wavelet and the third bounding region is positioned at a different second location around the second endpoint of the horizontal wavelet; and
a size of the second bounding region differs from a size of the third bounding region.

20. The method of claim 17, further comprising for each original Bezier curve, positioning a fourth bounding region around a second endpoint of the Bezier curve, wherein:
the first bounding region is positioned at a first location around the first endpoint of the Bezier curve and the fourth bounding region is positioned at a different second location around the second endpoint of the Bezier curve; and
a size of the first bounding region differs from a size of the fourth bounding region.

* * * * *